W. A. STEWART.
Feather-Renovator.

No. 199,478. Patented Jan. 22, 1878.

WITNESSES:
C. Neveux
J. H. Scarborough

INVENTOR:
W. A. Stewart
BY Munn & Co.
ATTORNEYS.

UNITED STATES PATENT OFFICE.

WILLIAM A. STEWART, OF BIG RAPIDS, MICHIGAN.

IMPROVEMENT IN FEATHER-RENOVATORS.

Specification forming part of Letters Patent No. 199,478, dated January 22, 1878; application filed September 10, 1877.

*To all whom it may concern:*

Figure 1:
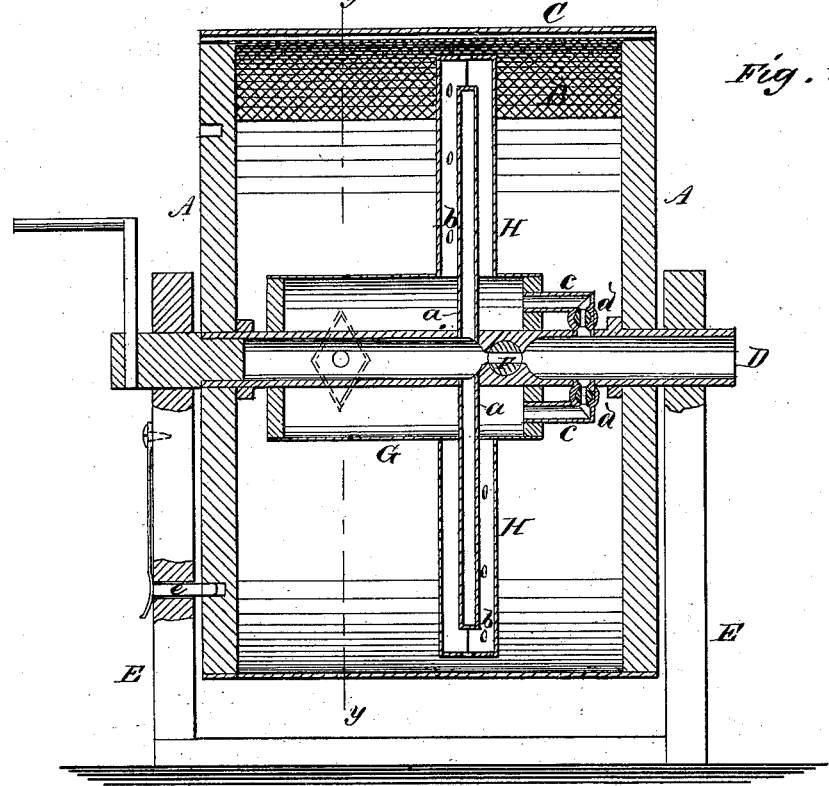
Figure 2:
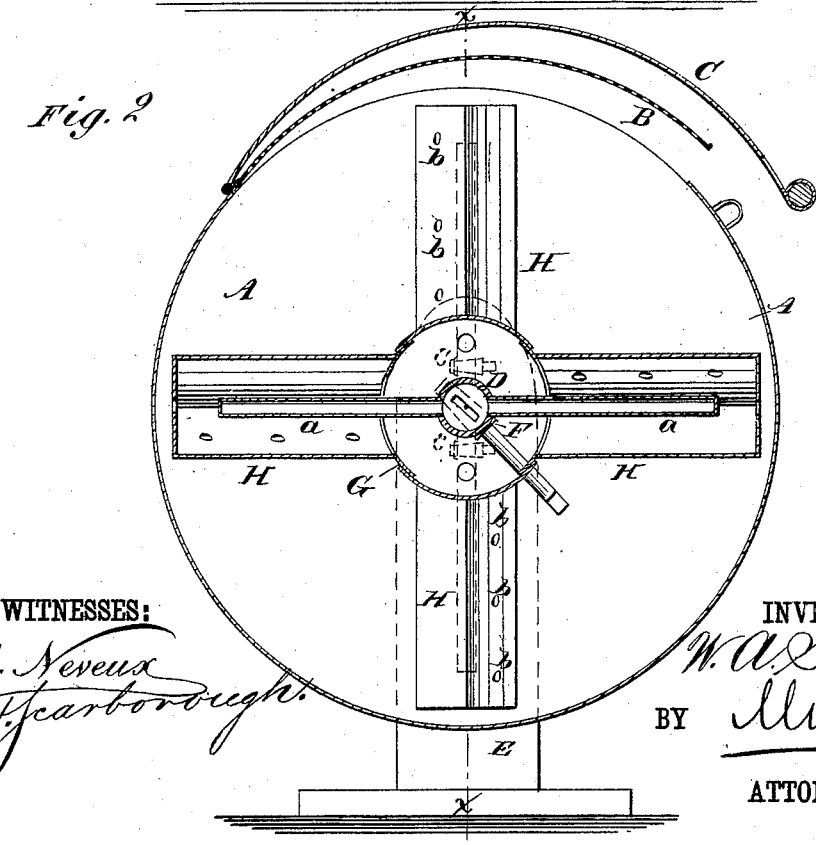

Be it known that I, WILLIAM A. STEWART, of Big Rapids, county of Mecosta, and State of Michigan, have invented a new and Improved Feather-Renovator, of which the following is a specification:

Figure 1 is a vertical section on line $x$ $x$ in Fig. 2. Fig. 2 is a vertical transverse section on line $y$ $y$ in Fig. 1.

Similar letters of reference indicate corresponding parts.

My invention consists in a cylinder mounted on a hollow shaft, and containing two sets of radial hollow arms, one set being placed within the other, and each being provided with separate steam pipes and valves, as hereinafter more fully described.

In the drawings, A is a zinc cylinder having wooden heads, and provided with a perforated-metal or wire-cloth door, B, and a tight door, C. The cylinder A is supported by a tubular shaft, D, which is journaled on standards E. One end of this shaft is closed and the other open, and from it two pairs of tubes, $a$, project radially. The tubes in each pair project from opposite sides of the tubular shaft, and the two pairs are placed a small distance apart and at right angles to each other.

In the tubular shaft, between its open end and the first pair of tubes $a$, a stop-valve, F, is placed. Surrounding the tubular shaft D there is a hollow perforated cylinder, G, from which tubes H project radially, and inclose the tubes $a$. These tubes are diamond-shaped in cross-section, and are perforated along their sides at $b$. The cylinder G is connected with the tubular shaft D by means of tubes $c$, having valves $d$. These tubes enter the shaft D outside of the valve F.

The head of the cylinder A is bored to receive a spring stop-bolt, $e$, by which the cylinder may be held in any required position.

The manner of using my improved renovator is as follows: Feathers are introduced through the doors while the door-opening is uppermost. The doors are then closed and the cylinder inverted. Steam is admitted, through the tubular shaft and through the pipes $c$, into the cylinder G, and thence, through tubes H and the perforations thereof, to interior of the cylinder A. The shaft D is continuously rotated while the steaming operation is carried on. The steam is thus thoroughly distributed among the feathers, and the feathers are agitated and permitted to expand. After they are sufficiently steamed, the steam is shut off from the cylinder G and turned on to the pipes $a$. The ends of these pipes are stopped, so that no steam can escape, and the pipes afford sufficient heat to quickly dry the feathers. During the operation of drying, the cylinder A is turned with its doors uppermost, and the tight door is opened, permitting the vapor and fumes to escape. The feathers are constantly agitated by turning the shaft D, and are kept from contact with the hot steam-pipes $a$ by the tubes $b$.

The advantages claimed for my improved apparatus are, that the feathers may be quickly and thoroughly cleansed, and may be rapidly dried without injury.

Having thus fully described my invention, I claim as new and desire to secure by Letters Patent—

1. The combination, in a feather-renovator, of a series of radial tubes for heating and drying, and a series of steaming-tubes, inclosing the heating-tubes, and serving the double purpose of distributing steam and of a guard for preventing the feathers from coming into contact with the heating-tubes during the secondary process of drying, substantially as herein shown and described.

2. The combination of the tubular shaft D, having valve F, tubes $a$, cylinder G, tubes H, and tubes $c$, having valves $d$, substantially as shown and described.

WILLIAM A. STEWART.

Witnesses:
JOHN B. UPTON,
M. W. BARROWS.